(12) United States Patent
Yamamoto

(10) Patent No.: US 8,223,314 B2
(45) Date of Patent: Jul. 17, 2012

(54) METHOD FOR MEASURING WAVEFRONT ABERRATION

(75) Inventor: Kazuki Yamamoto, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 558 days.

(21) Appl. No.: 12/507,159

(22) Filed: Jul. 22, 2009

(65) Prior Publication Data

US 2010/0026977 A1 Feb. 4, 2010

(30) Foreign Application Priority Data

Jul. 29, 2008 (JP) ................. 2008-195313

(51) Int. Cl.
*G03B 27/42* (2006.01)
(52) U.S. Cl. ............. 355/53; 355/67; 356/515; 356/521
(58) Field of Classification Search .................... 355/53, 355/67; 356/515, 521
See application file for complete search history.

(56) References Cited

U.S. PATENT DOCUMENTS

| 6,312,373 | B1 | 11/2001 | Ichihara |
| 6,456,382 | B2 | 9/2002 | Ichihara et al. |
| 6,765,683 | B2 | 7/2004 | Ichihara et al. |
| 2003/0215053 | A1 | 11/2003 | Ichihara |

FOREIGN PATENT DOCUMENTS

| JP | 2000-097666 A | 4/2000 |
| JP | 2000-146705 A | 5/2000 |

*Primary Examiner* — Edward Glick
*Assistant Examiner* — Mesfin T Asfaw
(74) *Attorney, Agent, or Firm* — Canon U.S.A., Inc. IP Division

(57) ABSTRACT

A method comprises determining a first processing center position to calculate a wavefront aberration of an optical system, determining a second processing center position to calculate a wavefront aberration, correcting the first processing center position in a first direction using the second processing center position in the first direction and correcting the second processing center position in a second direction using the first processing center position in the second direction.

16 Claims, 9 Drawing Sheets

- TENTATIVE CENTER
- COARSE DETECTION WINDOW
- × COARSE CENTER
- FINE DETECTION WINDOW

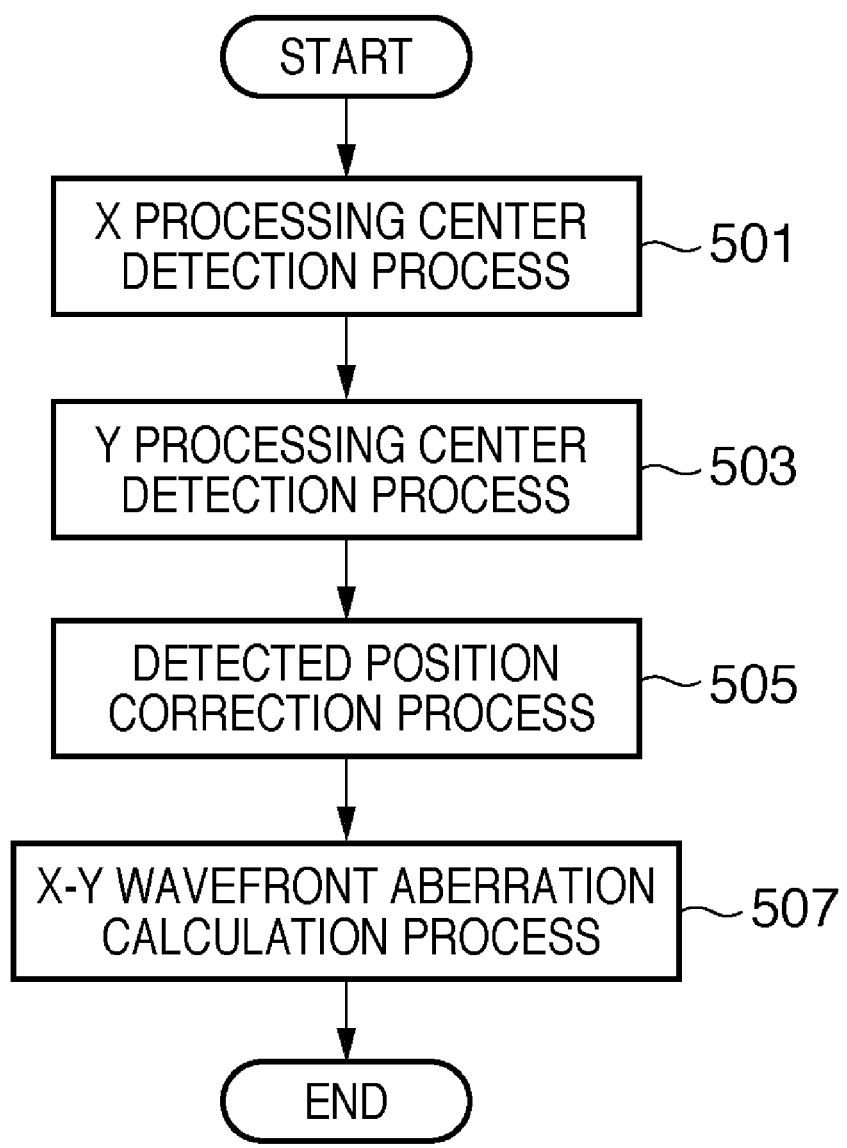

METHOD FOR MEASURING WAVEFRONT ABERRATION

BACKGROUND OF THE INVENTION

1. Field of the Invention

The present invention relates to a method for measuring the wavefront aberration of an optical system.

2. Description of the Related Art

An exposure apparatus which transfers the pattern of an original onto a substrate has been conventionally employed in manufacturing, for example, a semiconductor device by photolithography. Since the exposure apparatus may have to precisely transfer the pattern of an original onto a substrate as the exposure target body at a predetermined magnification, it is important to use a projection optical system which has small aberrations and thus is excellent in imaging performance. The importance of such a projection optical system is great especially in recent years, in which the pattern to be transferred is becoming more sensitive to the aberration of the projection optical system in response to a demand for further advances in micropatterning of a device pattern. This makes it necessary to measure the optical performance (e.g., the wavefront aberration) of the projection optical system with high accuracy. The simplification, speed-up, and cost reduction of the measurement are also important from the viewpoint of improving the productivity and economical efficiency of the exposure apparatus.

One conventional method observes by, for example, a scanning electron microscope (SEM) a resist pattern formed by projecting the pattern of an original onto a substrate coated with a resist to expose the resist, and developing the resist. This method takes a long time for processing operations such as exposure and development, so its reproducibility is poor due to errors generated in the process of resist coating and development.

A PDI (Point Diffraction Interferometer) having a pinhole to form an ideal spherical wave has been known. A shearing interferometer which exploits shearing interferometry has been known as well. Nowadays, a measurement apparatus which uses an LDI (Line Diffraction Interferometer) having a slit to form an ideal cylindrical wave or an ideal elliptical wave has been proposed.

In a wavefront aberration measurement apparatus of the LDI scheme, a measurement mark is formed on a plate set behind an optical system to be measured. The measurement mark includes a slit to form an ideal wavefront, and a window which transmits a wavefront which bears the aberration information of the optical system to be measured. A two-dimensional light-receiving element is set directly beneath the plate. The measurement of the wavefront aberration of the optical system to be measured includes sensing, by the two-dimensional light-receiving element, interference between two wavefronts formed by the measurement mark, and processing the sensed interference fringe image data.

For the conventional wavefront aberration measurement, and in particular, that of the LDI scheme, it is difficult to precisely determine the processing center positions, in both the X and Y directions, to process the interference fringe image data.

SUMMARY OF THE INVENTION

According to one aspect of the present invention, a method comprises determining a first processing center position to calculate a wavefront aberration of the optical system using a first mark including a first slit and a first window which are parallel to each other and extend along a first direction, by sequentially setting the optical system in a plurality of states in which the optical system has a plurality of spherical aberration amounts, and processing first interference fringe image data formed by the first mark and the optical system in each of the plurality of states, determining a second processing center position to calculate a wavefront aberration using a second mark including a second slit and a second window which are parallel to each other and extend along a second direction orthogonal to the first direction, by processing second interference fringe image data formed by the optical system and the second mark in each of the plurality of states, correcting the first processing center position in the first direction using the second processing center position in the first direction and correcting the second processing center position in the second direction using the first processing center position in the second direction, and calculating a wavefront aberration by processing the first interference fringe image data using the corrected first processing center position, and processing the second interference fringe image data using the corrected second processing center position.

According to another aspect of the present invention, a method comprises determining a first processing center position to calculate a wavefront aberration of an optical system having a plurality of spherical aberration amounts using a first mark by sequentially setting the optical system in a plurality of states, determining a second processing center position to calculate a wavefront aberration of the optical system using a second mark, correcting the first position in a first direction using the second position in the first direction and correcting the second processing center position in a second direction using the first position in the second direction, and calculating a wavefront aberration by processing the first and second interference fringe image data using the corrected first and second processing center positions, respectively.

Further features of the present invention will become apparent from the following description of exemplary embodiments with reference to the attached drawings.

BRIEF DESCRIPTION OF THE DRAWINGS

FIG. 13 is a flowchart showing a method for measuring the wavefront aberration of a projection optical system according to the second embodiment;

DESCRIPTION OF THE EMBODIMENTS

Embodiments of the present invention will be described below with reference to the accompanying drawings.

Figure 1:
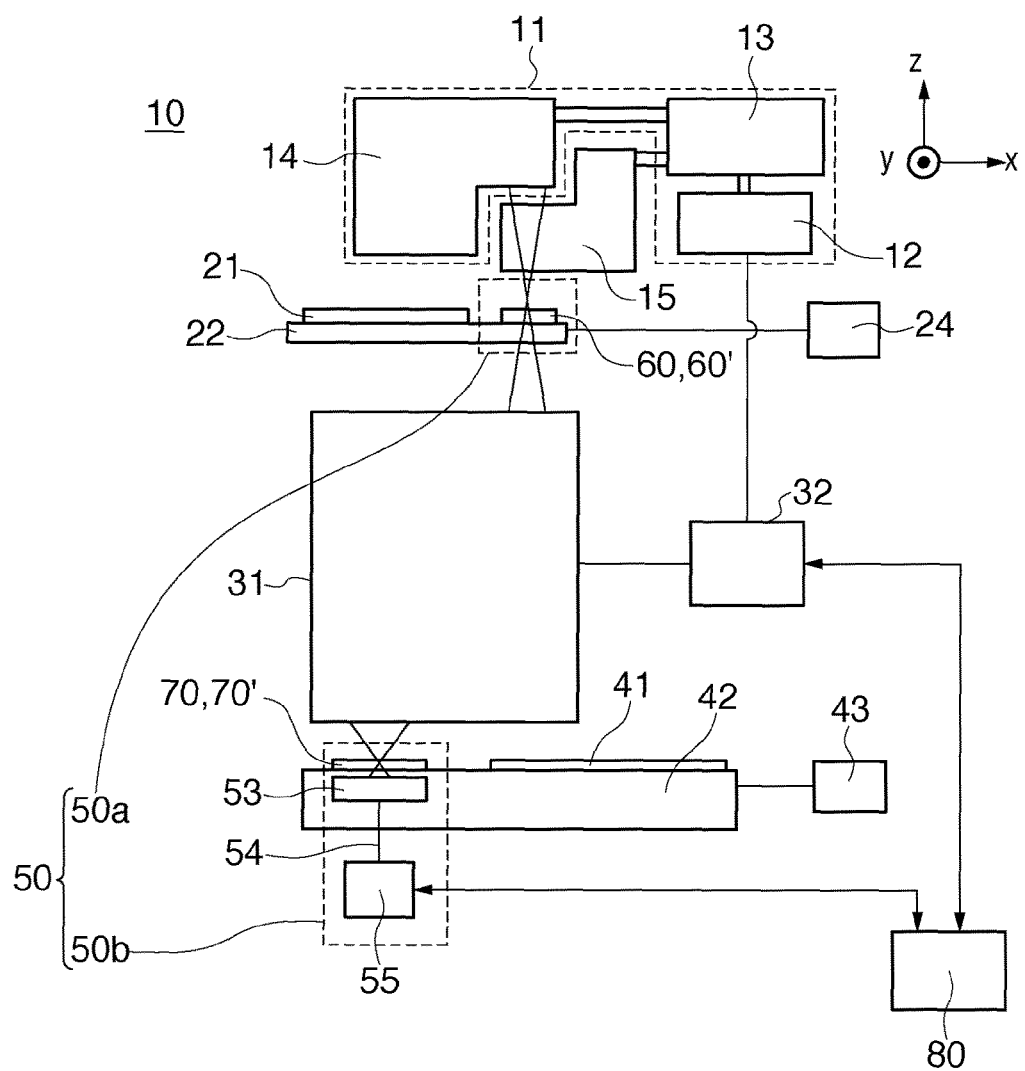
FIG. 1 is a schematic block diagram showing an exposure apparatus according to an embodiment of the present invention.

An exposure apparatus including a measurement apparatus of the PDI scheme will be explained below as a first embodiment of the present invention. FIG. 1 is a schematic block diagram showing an exposure apparatus 10 according to an embodiment of the present invention. Note that in this specification, two orthogonal directions in a plane parallel to the image plane of a projection optical system 31 are defined as the X and Y directions.

The exposure apparatus 10 projects the pattern of an original (also called a reticle or mask) 21 onto a substrate (wafer) 41 to expose the substrate 41 by, for example, the step & scan scheme or the step & repeat scheme. The exposure apparatus 10 is suitable for lithography in which a pattern having a submicron or quarter-micron line width or less is formed.

The step & scan scheme commonly means a scheme of transferring the pattern of an original onto a substrate while scanning them with respect to the projection optical system. The step & repeat scheme commonly means a scheme of transferring the pattern of an original onto a substrate while they stand still.

The exposure apparatus 10 includes, for example, a measurement apparatus 50, an illumination apparatus 11, an original stage 22, the projection optical system 31, and a substrate stage 42.

The illumination apparatus 11 includes a light source unit 12, extension optical system 13, and illumination optical system 14. The light source unit 12 can use, for example, an ArF excimer laser having a wavelength of about 193 nm or a KrF excimer laser having a wavelength of about 248 nm. However, the type of laser is not limited to an excimer laser, and the number of lasers is not limited, either. When the light source unit 12 uses a laser, a light beam shaping optical system which shapes a collimated light beam from the laser into a light beam shape, and an incoherent optical system which converts a coherent laser beam into an incoherent laser beam are used. Also, the light source which can be used for the light source unit 12 is not limited to a laser, and one or a plurality of lamps such as mercury lamps or xenon lamps can be used.

The illumination apparatus 11 forms an optical system which illuminates the original 21, and includes, for example, a lens, mirror, optical integrator, and σ stop. The extension optical system 13 guides the light beam from the light source unit 12 to the illumination optical system 14 and an alignment scope 15. The illumination optical system 14 also forms an optical system which illuminates the original 21, and has a configuration in which a condenser lens, fly-eye lens, aperture stop, condenser lens, slit, and imaging optical system are arrayed in this order.

The alignment scope 15 is retracted outside the optical path during normal exposure. The alignment scope 15 aligns the original 21 and the substrate 41 by aligning an alignment mark formed on the original 21 and that formed on the substrate 41 via the projection optical system 31.

The original 21 is made of, for example, quartz and has a pattern, to be transferred, formed on it. The original 21 is held by the original stage (reticle stage) 22. The original stage 22 is driven by a driving mechanism (not shown). Diffracted light generated by the original 21 is projected onto the substrate 41 by the projection optical system 31. The original 21 and the substrate 41 have an optically conjugate relationship.

If the exposure apparatus 10 is a scanner, it transfers the pattern of the original 21 onto the substrate 41 by scanning them at a speed ratio matching the magnification of the projection optical system 31. If the exposure apparatus 10 is a stepper, it transfers the pattern of the original 21 onto the substrate 41 while they stand still.

The projection optical system 31 can be a dioptric system including a plurality of lens elements. Alternatively, the projection optical system 31 can be an optical system including a plurality of lens elements and a mirror (a catadioptric system). The projection optical system 31 can be an optical system including a plurality of lens elements and one diffractive optical element such as a kinoform. The projection optical system 31 can be an optical system including mirrors alone. If chromatic aberration correction is necessary, a plurality of lens elements made of glass materials having different degrees of dispersion (Abbe numbers) can be used, or the diffractive optical element can be configured to cause dispersion in a direction opposite to that caused by the lens elements. The optical performance (e.g., the wavefront aberration) of the projection optical system 31 is measured by the measurement apparatus 50.

The substrate 41 has a surface coated with a resist. The substrate 41 is held by the substrate stage 42 through a chuck (not shown). The substrate stage 42 holds not only the substrate 41 but also a constituent component 50b of the measurement apparatus 50. The substrate stage 42 is driven by a driving mechanism (not shown) controlled by a substrate stage controller 43. With this operation, the substrate 41 and the constituent component 50b of the measurement apparatus 50 move in the X and Y directions. The substrate stage 42 and the original stage 22 undergo position calibration using the alignment scope 15, and then can be driven at a constant speed ratio under the control of an original stage controller 24 and the substrate stage controller 43.

The measurement apparatus 50 includes a constituent component 50a mounted on the original stage 22, and the constituent component 50b mounted on the substrate stage 42. The illumination optical system 14 can be used to illuminate not only the original 21 during the exposure of the substrate 41, but also masks, used to measure the optical performance of the projection optical system 31 by the measurement apparatus 50, during this measurement. The constituent component 50a includes a first mask 60. The constituent component 50b can include a second mask 70, image sensor 53, cable 54, and measurement controller 55. In this embodiment, the measurement apparatus 50 includes an interferometer which measures the optical performance of the projection optical system 31 by detecting interference fringes formed via the projection optical system 31 as the optical system to be measured. In this embodiment, an interferometer of the PDI scheme can be used for that purpose.

The first mask 60 can be configured by forming a light-shielding member made of, for example, chromium on the surface of a transparent substrate made of, for example, quartz or fluorite. The light beam from the illumination optical system 14 converges on the first mask 60 located on the original stage 22. The converging light beam illuminates the first mask 60 with a coherence factor σ=1, which equals a numerical aperture NAo of the projection optical system 31 on its original side, that is, its object side.

Figure 2:
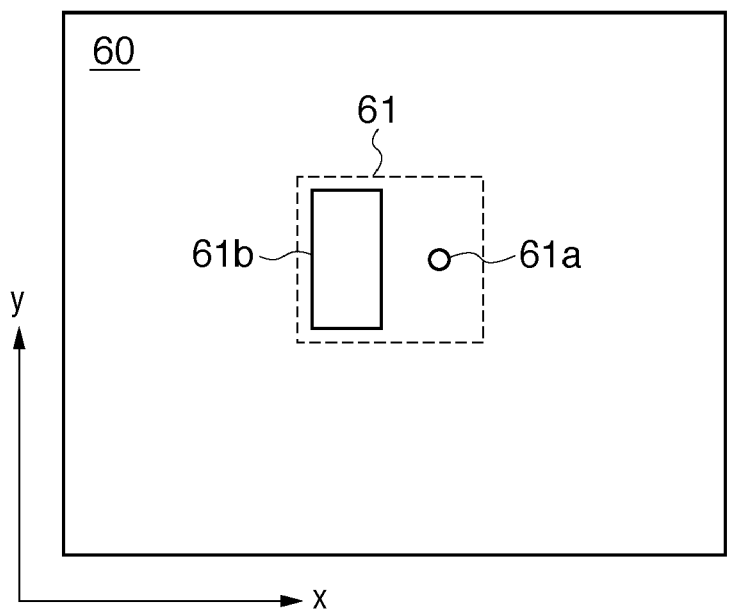
FIG. 2 is a plan view illustrating the arrangement of a first mask in the first embodiment.

FIG. 2 is a plan view illustrating the arrangement of the first mask 60. The first mask 60 includes a pair of a pinhole 61a and a window 61b, as shown in FIG. 2. Letting NAo be the numerical aperture of the projection optical system 31 on its original side, that is, its object side, a diameter Δr of the pinhole 61a has a value which satisfies:

$$\Delta r < 0.5 \times \lambda / NAo \qquad (1)$$

Determining the diameter Δr of the pinhole 61a to satisfy inequality (1) allows the light diffracted by the pinhole 61a to have an in-phase wavefront within the range of the numerical aperture NAo. On the other hand, the window 61b has a width Δr' of λ/NAo or less. The width Δr' may be set to roughly fall within the range defined by inequality (1). However, the light having passed through the window 61b need not have an in-phase wavefront on the original side in order to pass it through a pinhole having a width which satisfies inequality (1) on the substrate side, as will be described later. Hence, the window 61b can be designed to have a relatively wide width Δr' from the viewpoint of ensuring a given light amount.

Figure 3:
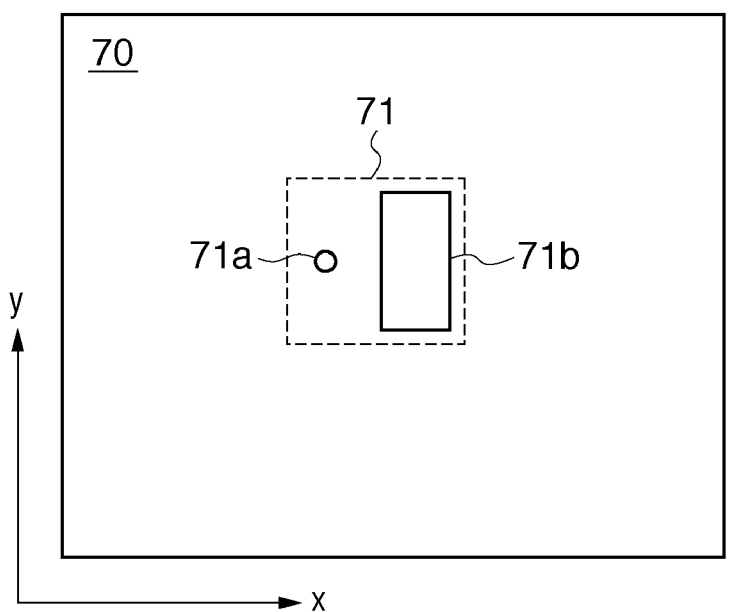
FIG. 3 is a plan view illustrating the arrangement of a second mask in the first embodiment.

FIG. 3 is a plan view illustrating the arrangement of the second mask 70. The second mask 70 includes a pair of a pinhole 71a and a window 71b, as shown in FIG. 3. Letting NAi be the numerical aperture of the projection optical system 31 on its substrate side, that is, its image plane side, a diameter Δw of the pinhole 71a has a value which satisfies:

$$\Delta w < 0.5 \times \lambda / NAi \qquad (2)$$

Determining the diameter Δw of the pinhole 71a to satisfy inequality (2) allows the light diffracted by the pinhole 71a to have an in-phase wavefront within the range of the numerical aperture NAi. A width Δw' of the window 71b can be determined based on the spatial frequency of the projection optical system 31 to be measured. More specifically, the width Δw' of the window 71b is set wide if high-frequency components of the spatial frequency are to be measured, and is set narrow if only low-frequency components of the spatial frequency are to be measured. Letting f be the spatial frequency in the pupil of the projection optical system 31, the width Δw' is given by:

$$\Delta w' = 2 \times f \times \lambda / NAi \qquad (3)$$

Note that a spatial frequency f, of the wavefront aberration, which has one period equal to the pupil radius, is assumed to be 1.

The image sensor 53 can include a photosensor such as a CCD. The cable 54 connects the image sensor 53 and the measurement controller 55. The measurement controller 55 includes, for example, a processor and memory. The processor performs processing for obtaining aberration information based on the interference fringe data provided by the image sensor 53. The memory stores data groups such as information necessary for the processing (e.g., offset parameters), and the processing results (e.g., wavefront aberration data and Zernike coefficients).

The Fourier transform method or the electronic moiré method, for example, is used for phase information calculation in the processor of the measurement controller 55. The Fourier transform method acquires phase information by two-dimensionally Fourier-transforming a single interference fringe image, extracting a spatial frequency domain containing the separated test wavefront information, shifting the origin of this domain, and inversely Fourier-transforming this domain. Also, the electronic moiré method generates at least three reference grating images which have the same carrier frequency as that of a single test interference fringe image and are out of phase with each other. Then, this method acquires phase information by processing based on the low-pass filter phase shift method for the at least three moiré fringes generated from the test interference fringe image and the reference grating images.

The aberration information of the projection optical system 31, which is stored in the memory in the measurement controller 55, is sent to a main control system 80. In accordance with the received aberration information, the main control system 80 calculates the lens driving amount and wavelength driving amount necessary to correct the aberration, and outputs them to a projection system controller 32.

The projection system controller 32 controls a lens driving unit which displaces an aberration correction lens of the plurality of lenses which constitute the projection optical system 31, and controls the wavelength of the light emitted by the light source unit 12. This makes it possible to generate a targeted aberration amount in the projection optical system 31.

Figure 4:
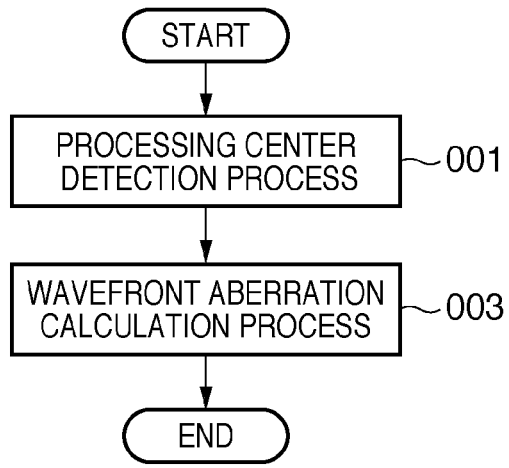
FIG. 4 is a flowchart showing a method for measuring the wavefront aberration of a projection optical system according to the first embodiment.

FIG. 4 is a flowchart showing a method for measuring the wavefront aberration of the projection optical system 31 according to the first embodiment. This measurement method is controlled by the main control system 80. This control includes control of the measurement controller 55 by the main control system 80. The method for measuring the wavefront aberration, shown in FIG. 4, includes a processing center position detection process (step 001) and wavefront aberration calculation process (step 003).

Figure 5:
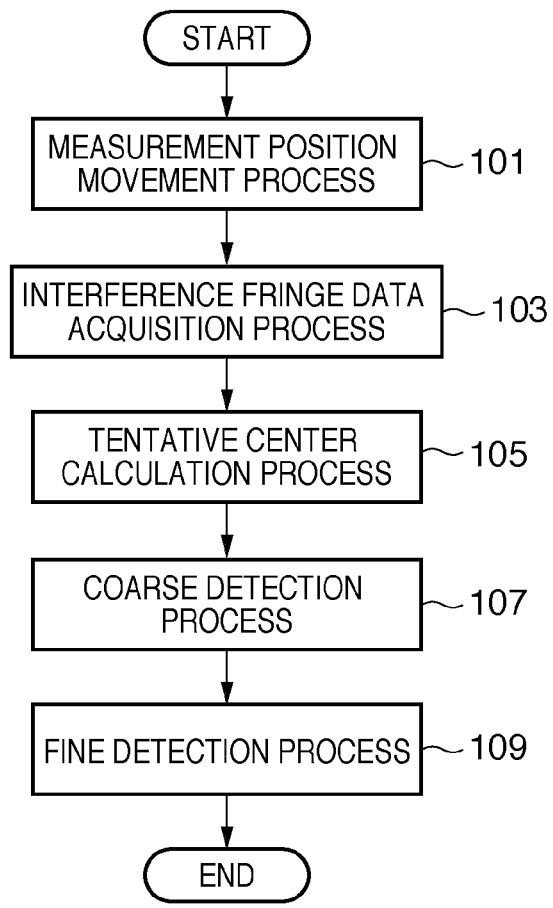
FIG. 5 is a flowchart showing the detailed processing in step 001 of FIG. 4.

FIG. 5 is a flowchart showing the detailed processing in the processing center detection process (step 001). The processing center detection process (step 001) includes a measurement position movement process (step 101), interference fringe data acquisition process (step 103), tentative center calculation process (step 105), coarse detection process (step 107), and fine detection process (step 109).

In the measurement position movement process (step 101), the main control system 80 aligns the illumination optical system 14, the first mask 60, and the second mask 70. In the measurement position movement process (step 101), the main control system 80 adjusts the positions of the illumination optical system 14 and first mask 60 first. More specifically, the positions of the illumination optical system 14 and first mask 60 are adjusted so that the light emitted by the light source unit 12 strikes only a mark 61 on the first mask 60 by the σ stop of the illumination optical system 14 after being guided to the illumination optical system 14 by the extension optical system 13. Note that because the pinhole 61a has a width which satisfies inequality (1), it outputs a diffracted light beam having a spherical in-phase wavefront. The diffracted light beam illuminates the entire region in the pupil of the projection optical system 31. On the other hand, the light beam having passed through the window 61b turns into that which bears the aberration information of the illumination optical system 14.

The main control system 80 adjusts the position of the substrate stage 42 so that the light having passed through the mark 61 on the first mask 60 forms an image of a mark 71 on the second mask 70 by the projection optical system 31. With this operation, the pinhole 61a and window 61b in the first mask 60 are imaged on the window 71b and pinhole 71a, respectively, in the second mask 70.

The light beam diffracted by the pinhole 71a has a spherical in-phase wavefront. On the other hand, the light beam having passed through the window 71b bears the wavefront aberration information of the projection optical system 31 because it has passed through the projection optical system 31 after being shaped into an in-phase wavefront in the X direction by the pinhole 61a.

Figure 6:
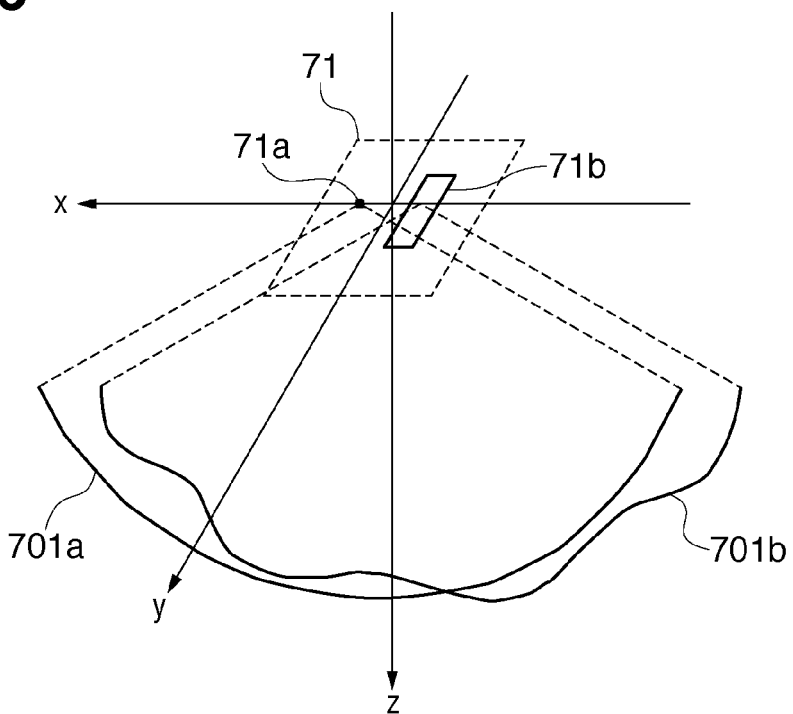
FIG. 6 is a diagram schematically showing light beams respectively having passed through a pinhole and window in the second mask shown in FIG. 3.

FIG. 6 is a diagram schematically showing the light beams having passed through the pinhole 71a and the window 71b. The light beam having passed through the pinhole 71a has a spherical ideal wavefront 701a, and the light beam having passed through the window 71b has a test wavefront 701b.

Figure 7:
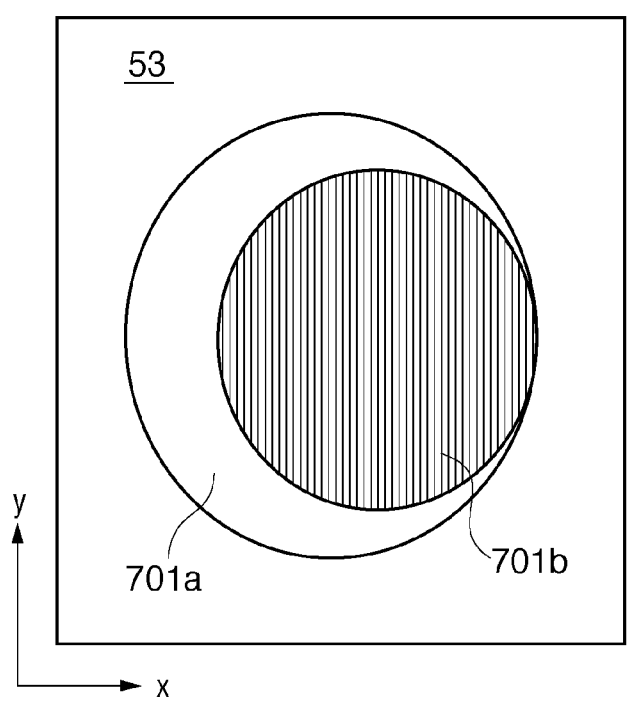
FIG. 7 is a view illustrating interference fringes formed on the image sensing plane of an image sensor.

FIG. 7 is a view illustrating interference fringes formed on the image sensing plane of the image sensor 53. Interference fringes are formed on the image plane of the image sensor 53 by the light beams having passed through the pinhole 71a and the window 71b. Two images in the pupil of the projection optical system 31, whose centers are shifted from each other by the interval between the pinhole 71a and the window 71b, are formed on the image sensing plane, and interference fringes appear in the overlapping region of these two images.

In the interference fringe data acquisition process (step 103), the main control system 80 causes the image sensor 53 to sense interference fringe image data (interference fringe data) at each of a plurality of spherical aberration amounts while adjusting the projection optical system 31 to have the plurality of wavefront aberration amounts. With this operation, a plurality of interference fringe image data is obtained.

Note that the projection system controller 32 has already registered data representing the relationship between the spherical aberration amount of the projection optical system 31 and the driving amount of the lenses which constitute the projection optical system 31. The main control system 80 issues a command designating the spherical aberration amount to be generated to the projection system controller 32. In accordance with the received command, the projection system controller 32 moves the lens group of the projection optical system 31 so as to generate the designated spherical aberration amount. In the interference fringe data acquisition process (step 103), the image sensor 53 senses interference fringe image data in each of states in which spherical aberrations of, for example, −100 mλ, 0 mλ, and +100 mλ are generated. The plurality of sensed interference fringe image data are output to the measurement controller 55.

In the tentative center calculation process (step 105), the main control system 80 calculates the tentative center position, that is, the center position of the coarse detection window in the coarse detection process (step 107). A barycenter calculation method, for example, is suitable as the method for calculating the tentative center position. This method weights each pixel position in the interference fringe image data acquired in step 103 by a light amount value. The tentative center position used as the center position of the coarse detection window may be, for example, the average of the barycentric positions calculated from the plurality of image data acquired in step 103, or the barycentric position calculated from one of these image data. Alternatively, the tentative center position may be a design value determined based on the arrangement of the measurement apparatus 50 (the constituent member and positional relationship between the second mask 70 and the image sensor 53).

In the coarse detection process (step 107), the main control system 80 calculates the coma amounts from the plurality of image data, acquired in step 103, while shifting the processing center position in the X and Y directions near the tentative center position calculated in step 105 (in the coarse detection window). The main control system 80 detects a position at which the difference among the coma amounts calculated from the plurality of image data is minimum, and sets it as a coarse center position. The reason why the difference among the coma amounts is used is that only spherical aberrations account for the difference among the wavefront aberrations calculated from the plurality of sensed interference fringe image data (see the processing in step 103).

Figure 8:
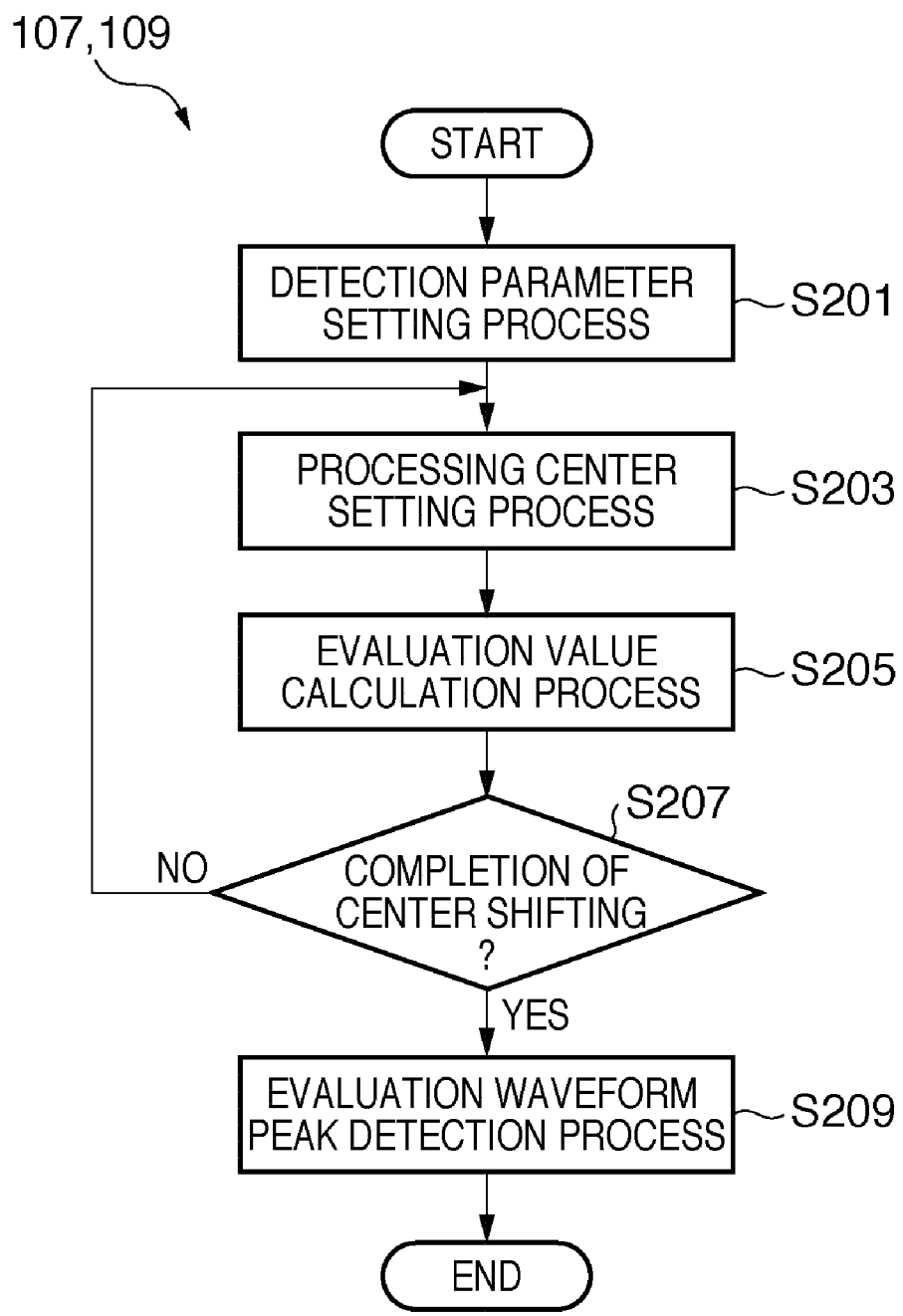
FIG. 8 is a flowchart showing the detailed processing operations in steps 107 and 109 of FIG. 5.

FIG. 8 is a flowchart showing the detailed processing in the coarse detection process (step 107). Step 107 includes a detection parameter setting process (step S201), processing center setting process (step S203), evaluation value calculation process (step S205), and evaluation waveform peak detection process (step S209).

In the detection parameter setting process (step S201), the main control system 80 sets the coarse detection parameters. As coarse detection parameters, the main control system 80 sets, for example, four parameters, that is, the width and height of the coarse detection window, and the pitches at which the processing center is shifted in the X and Y directions.

The width and height of the coarse detection window is to be determined such that this window has a margin large enough to allow the amount of deviation of the tentative center position calculated in step 105 from a true processing center position to fall within the coarse detection window size. The width and height of the coarse detection window can be set within the range of, for example, 50 pixels×50 pixels. Also, the center shift pitch is to be set to a value small enough to allow the amount of deviation of the coarse center position calculated in step 107 from a true processing center position to fall within the fine detection window size in the next step 109. The center shift pitch can be set to, for example, 5 pixels.

Figure 9:
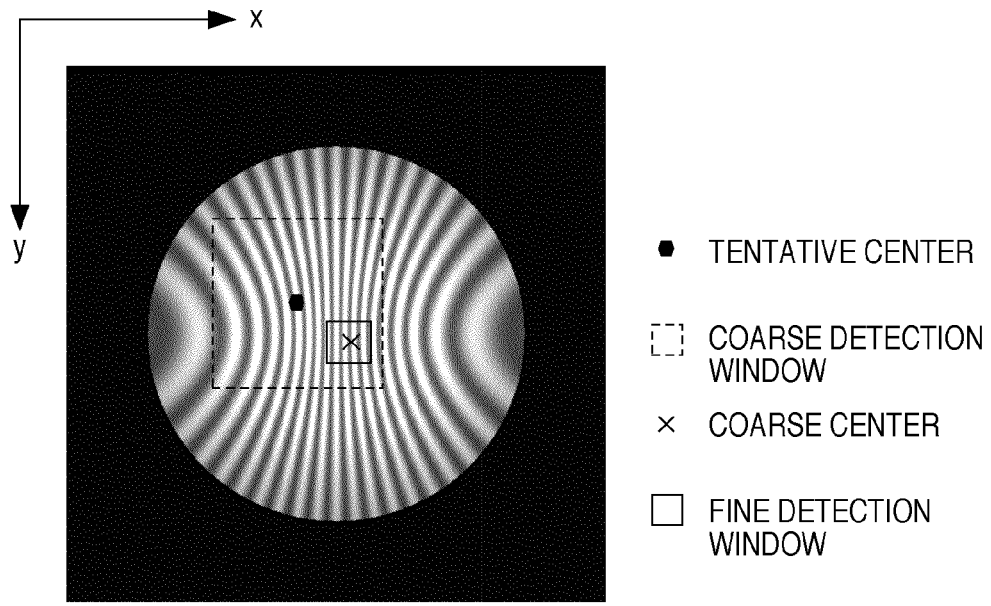
FIG. 9 is a schematic view showing detection parameters for the processing center position in the first embodiment.

FIG. 9 is a view illustrating the positional relationship among the tentative center position (a "●" mark), the coarse detection window (a dotted frame), the coarse center position (a "×" mark), and the fine detection window (a solid frame). The coarse detection window having its center matching the tentative center position is large enough to include the true processing center. The fine detection window having its center matching the coarse center position is determined in accordance with the calculation accuracy of the coarse center position.

In the processing center setting process (step S203), the main control system 80 determines the initial processing center position in accordance with the parameters determined in step S201. The position of an upper left pixel in the coarse detection window, for example, can be determined as the processing center position.

In the evaluation value calculation process (step S205), the main control system 80 causes the measurement controller 55 to calculate the wavefront aberration by processing the plurality of interference fringe image data, sensed in step 103, using the processing center position set in step S203. The measurement controller 55 calculates the wavefront aberration amounts from the plurality of interference fringe image data. The main control system 80 calculates an evaluation value for center position detection from the wavefront aberration amounts calculated from the plurality of image data in this way. For example, the evaluation value is calculated as follows.

The plurality of wavefront aberration amounts each are expanded into Zernike polynomials. With this operation, a plurality of Zernike polynomials is obtained. The coma amount (e.g., the coma amount represented by the 7 th term of the Zernike polynomials) is extracted from the aberration amounts represented by the Zernike polynomials (e.g., the aberration amounts represented by the 1 st to 36 th terms of the Zernike polynomials). From the coma amounts extracted from the plurality of Zernike polynomials, an evaluation value X can be calculated by:

$$X = 1/(|C1-C2|+|C2-C3|+|C3-C|) \quad (4)$$

Note that equation (4) shows an example in which three interference fringe image data corresponding to three spherical aberrations are acquired in step 103, three of Zernike polynomials are generated from the three interference fringe image data in step S205, and three coma amounts C1, C2, and C3 are extracted.

The evaluation value X expressed by equation (4) is the reciprocal of the sum of the differences among the three coma amounts. In other words, the evaluation value represents the coma change amount among the three wavefront aberrations (the amount of change in coma in response to a change in the spherical aberration amount). The smaller the coma change amount, the larger the evaluation value X.

Although the evaluation value obtained contains the information of only the 7 th terms of the plurality of Zernike polynomials as the coma amounts in the above-mentioned example, it may contain the information of high-order comas (the 14 th term, 23 rd term, 34 th term, . . . ). Also, the evaluation value obtained may contain not only cos θ aberration components (the 7 th term, 14 th term, . . . ) but also sin θ aberration components (the 8 th term, 15 th term, . . . ). In addition, the evaluation value calculation equation only represents the difference among the comas in a plurality of wavefront aberrations, and is not limited to equation (4).

In step S207, the main control system 80 checks whether evaluation values have been calculated over the entire region of the coarse detection window. If the calculation of evaluation values over the entire region is incomplete, the process returns to step S203, in which the next processing center position is set and the same processing is repeated.

In the evaluation waveform peak detection process (step S209), the main control system 80 calculates the coarse center position based on each evaluation value, in the coarse detection window, calculated by repeating steps S203, S205, and S207.

Figure 10:
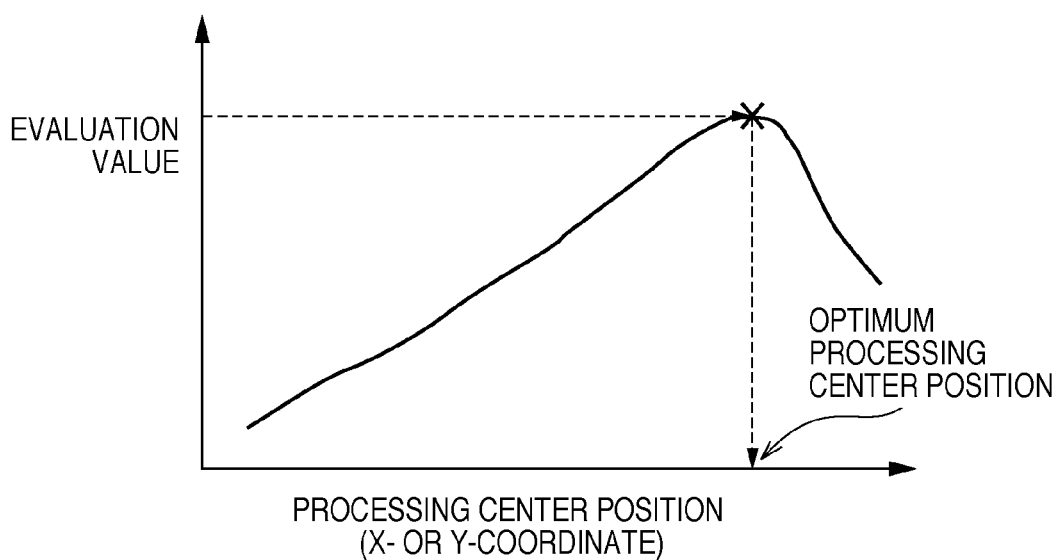
FIG. 10 is a schematic graph for explaining step S209 of FIG. 8 in the first embodiment.

FIG. 10 is a graph in which the abscissa indicates the processing center position, and the ordinate indicates the evaluation value X. As the processing center position deviates from the true value of the wavefront center position, the coma change amount increases and therefore the evaluation value X decreases. In other words, the evaluation curve is a convex curve which has a maximum evaluation value when the processing center position matches the true wavefront center position, as shown in FIG. 10. Hence, the coarse center position is calculated by peak detection processing (e.g., barycenter calculation) for the obtained evaluation curve. The calculated coarse center position is stored in, for example, the memory in the measurement controller 55.

Subsequent to the coarse detection process (step 107), the fine detection process (step 109) is performed. In the fine detection process (step 109), the main control system 80 calculates the coma amounts from the plurality of image data, acquired in step 103, while shifting the processing center position in the X and Y directions near the coarse center position calculated in step 107 (in the fine detection window). The main control system 80 detects a position at which the difference among the coma amounts calculated from the plurality of image data is minimum, and sets it as a fine center position.

The processing in step 109 is nearly the same as in step 107, and will be explained with reference to FIG. 8. Step 109 includes steps S201 to S209, like step 107.

In the detection parameter setting process (step S201), the main control system 80 sets fine detection parameters. As fine detection parameters, the main control system 80 sets, for example, four parameters, that is, the width and height of the fine detection window, and the pitches at which the processing center is shifted in the X and Y directions.

The width and height of the fine detection window is to be determined such that this window has a margin large enough to allow the amount of deviation of the coarse center position calculated in step 107 from a true processing center position to fall within the fine detection window size. The width and height of the fine detection window can be set within the range of, for example, 2 pixels×2 pixels. Also, the center shift pitch is to be set to a value small enough to allow the amount of deviation of the fine center position calculated in step 109 from a true processing center position to fall within a tolerance practical from the viewpoint of ensuring the accuracy of wavefront aberration measurement. The center shift pitch can be set to, for example, 0.1 pixels.

The processing operations in steps S203 to S209 of the fine detection process (step 109) are the same as in the coarse detection process (step 107) except for a difference in the detection parameters set, and a description thereof will not be given.

In the above-described way, the processing center detection process (step 001 in FIG. 4) is completed. The fine center position calculated in step 109 is stored in, for example, the memory area in the measurement controller 55 as the processing center position used in the following wavefront aberration calculation process (step 003).

In the wavefront aberration calculation process (step 003), the main control system 80 calculates the wavefront aberration by processing the interference fringe image data, acquired in step 001 (step 103), using the processing center position stored in the memory in the measurement controller 55.

The method for measuring the wavefront aberration according to this embodiment can determine the center position, of an interference fringe image, to calculate the wavefront aberration with high accuracy, and can therefore calculate (measure) the wavefront aberration.

An exposure apparatus including a measurement apparatus of the LDI scheme will be explained below as a second embodiment of the present invention. FIG. 1 is a schematic block diagram showing an exposure apparatus 10 according to an embodiment of the present invention. Note that in the second embodiment, the first mask 60 and the second mask 70 in the first embodiment are replaced with a first mask 60' and a second mask 70', respectively.

Figure 11:
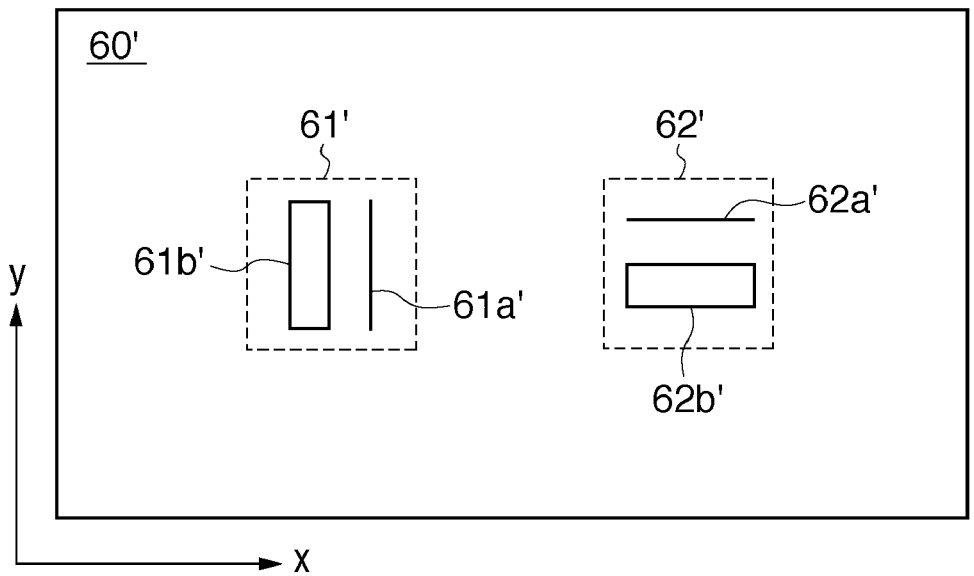
FIG. 11 is a plan view illustrating the arrangement of a first mask in the second embodiment.

FIG. 11 is a plan view illustrating the arrangement of the first mask 60'. The first mask 60' includes marks 61' and 62'. The mark 61' includes a slit 61a' and window 61b' which are parallel to each other and extend along the Y direction (first direction). The mark 62' includes a slit 62a' and window 62b' which are parallel to each other and extend along the X direction (second direction). The slits and windows of the marks 61' and 62' have the same widths and the same interval between them, but have different orientations. Letting NAo be the numerical aperture of a projection optical system 31 on its original side, that is, its object side, a width Δr of the slits 61a' and 62a' is determined to satisfy inequality (1).

Determining the width Δr of the slits 61a' and 62a' to satisfy inequality (1) allows the light diffracted by each of the slits 61a' and 62a' to have an in-phase wavefront within the range of the numerical aperture NAo. On the other hand, the windows 61b' and 62b' have a width Δr' of λ/NAo or less. The width Δr' may be set to roughly fall within the range defined by inequality (1). However, the light having passed through each of the windows 61b' and 62b' need not have an in-phase wavefront on the original side in order to pass it through a slit having a width which satisfies inequality (1) on the substrate side, as will be described later. Hence, the windows 61b' and 62b' can be designed to have a relatively wide width Δr' from the viewpoint of ensuring a given light amount.

Figure 12:
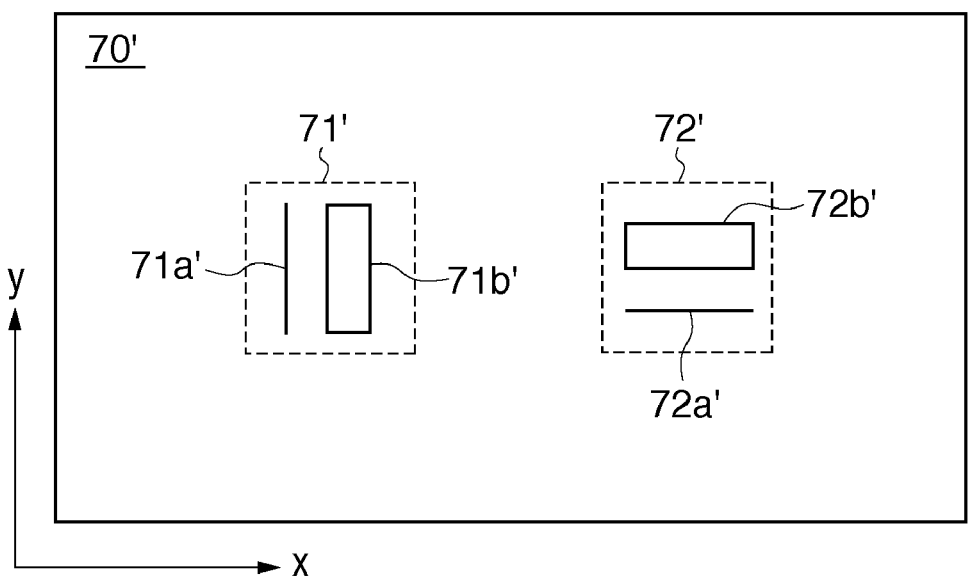
FIG. 12 is a plan view illustrating the arrangement of a second mask in the second embodiment.

FIG. 12 is a plan view illustrating the arrangement of the second mask 70'. The second mask 70' includes marks 71' and 72'. The mark 71' includes a slit 71a' and window 71b' which are parallel to each other and extend along the Y direction. The mark 72' includes a slit 72a' and window 72b' which are parallel to each other and extend along the X direction. The slits and windows of the marks 71' and 72' have the same widths and the same interval between them, but have different orientations. Letting NAi be the numerical aperture of the projection optical system 31 on its substrate side, that is, its image plane side, a width Δw of the slits 71a' and 72a' is determined to satisfy inequality (2).

Determining the width Δw of the slits 71a' and 72a' to satisfy inequality (2) allows the light diffracted by each of the slits 71a' and 72a' to have an in-phase wavefront within the range of the numerical aperture NAi.

A width Δw' of the windows 71b' and 72b' can be determined based on the spatial frequency of the projection optical system 31 to be measured. More specifically, the width Δw' of the windows 71b' and 72b' is set wide if high-frequency components of the spatial frequency are to be measured, and is set narrow if only low-frequency components of the spatial frequency are to be measured. Letting f be the spatial frequency in the pupil of the projection optical system 31, the width Δw' is given by equation (3).

The longer a length Lw of the slits and windows, the more appropriate the light amount obtained becomes. Nevertheless, the length Lw falls within a region in which the aberration of the projection optical system 31 is uniform (a so-called isoplanatic region).

For the sake of descriptive convenience, the marks 61' and 71' will often be referred to as X marks (first marks), and the marks 62' and 72' will often be referred to as Y marks (second marks) hereinafter. Also, interference fringes formed by the X mark and the Y mark will be referred to as X interference fringes (first interference fringes) and Y interference fringes (second interference fringes), respectively, hereinafter.

FIG. 13 is a flowchart showing a method for measuring the wavefront aberration of the projection optical system 31 according to the second embodiment. This measurement method is controlled by a main control system 80. This control includes control of a measurement controller 55 by the main control system 80. The method for measuring the wavefront aberration, shown in FIG. 13, includes an X processing center detection process (step 501), Y processing center detection process (step 503), detected position correction process (step 505), and X-Y wavefront aberration calculation process (step 507).

In the X processing center detection process (step 501; a first determination process), the main control system 80 acquires a plurality of X interference fringe image data having different spherical aberration amounts, and processes these image data, thereby calculating the X interference fringe processing center position.

The detailed processing in the X processing center detection process (step 501) is nearly the same as in step 001 in the first embodiment, and will be explained with reference to the flowchart in FIG. 5. However, for the sake of distinction from the first embodiment, steps 101 to 109 in the first embodiment are replaced with steps 101x to 109x in the following description.

In the measurement position movement process (step 101x), the main control system 80 aligns an illumination optical system 14, the first mask 60', and the second mask 70'. More specifically, first, the main control system 80 adjusts the positions of the illumination optical system 14 and first mask 60' so that the light strikes only the mark 61' on the first mask 60'. Note that because the slit 61a' has a width which satisfies inequality (1), it outputs a diffracted light beam having an in-phase wavefront in the X direction. The diffracted light beam illuminates the entire region in the pupil of the projection optical system 31. On the other hand, the light beam having passed through the window 61b' turns into that which bears the aberration information of the illumination optical system 14.

The main control system 80 adjusts the position of a substrate stage 42 so that the light having passed through the mark 61' on the first mask 60' forms an image of the mark 71' on the second mask 70' by the projection optical system 31. With this operation, the slit 61a' and window 61b' in the first mask 60' are imaged on the window 71b' and slit 71a', respectively, in the second mask 70'.

The light beam diffracted by the slit 71a' has an in-phase wavefront in the X direction. On the other hand, the light beam having passed through the window 71b' bears the wavefront aberration information of the projection optical system 31 because it has passed through the projection optical system 31 after being shaped into an in-phase wavefront in the X direction by the slit 61a'.

The interference fringe data acquisition process (step 103x) and tentative center calculation process (step 105x) are the same as in the first embodiment, and a description thereof will not be given.

In the coarse detection process (step 107x), the main control system 80 calculates the coma amounts from the plurality of image data, acquired in step 103x, while shifting the processing center position in the X and Y directions near the tentative center position calculated in step 105x (in the coarse detection window). The main control system 80 detects a position at which the difference (an evaluation value X expressed by equation (4)) among the coma amounts calculated from the plurality of image data is minimum, and sets it as a coarse center position (first coarse center position).

The detailed processing in step 107x is nearly the same as in step 107 in the first embodiment, and will be explained with reference to the flowchart in FIG. 8.

In step S201, the main control system 80 sets coarse detection parameters. As coarse detection parameters, the main control system 80 sets, for example, four parameters, that is, the width and height of the coarse detection window, and the pitches at which the processing center is shifted in the X and Y directions.

The width and height of the coarse detection window is to be determined such that this window has a margin large enough to allow the amount of deviation of the tentative center position calculated in step 105x from a true processing center position to fall within the coarse detection window size. The width and height of the coarse detection window can be set within the range of, for example, 50 pixels×1 pixel. Also, the center shift pitch is to be set to a value small enough to allow the amount of deviation of the coarse center position calculated in step 107x from a true processing center position to fall within the fine detection window size in step 109x. The center shift pitch can be set to, for example, 5 pixels.

Figure 14A:
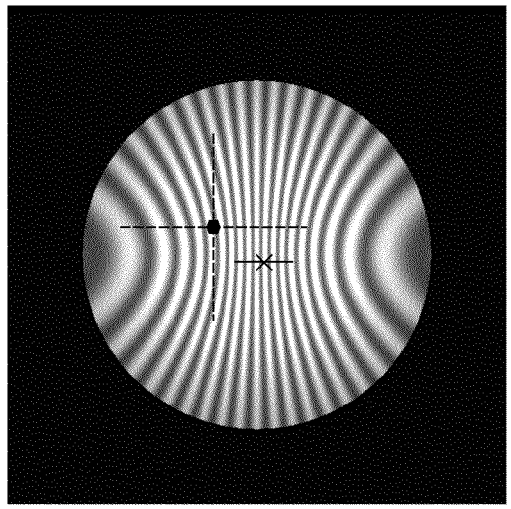
FIGS. 14A and 14B are schematic views each showing detection parameters for the processing center position in the second embodiment.

FIG. 14A is a view illustrating the positional relationship among the tentative center position (a "●" mark), the coarse detection window (a dotted line), the coarse center position (a "×" mark), and the fine detection window (a solid line). The purpose of adopting a cross-shaped window as the coarse detection window, in place of a quadrangular window as shown in FIG. 9, in the example shown in FIG. 14A is to shorten the processing time in the coarse detection process.

As described above, when a given coarse detection accuracy is expected to be ensured without calculating evaluation values over the entire region in the quadrangular window frame, it is possible to thin the window shape, reduce the window size, or widen the center shift pitches. This makes it possible to decrease the number of times of repetition of steps S203x to S207x, thus shortening the processing time.

The processing operations in steps S203 to S209 are the same as in steps S203 to S209 in the first embodiment except for a difference in the detection parameters set, and a description thereof will not be given.

In the above-described way, the calculation of the coarse center position (first coarse center position) in the coarse detection process (step 107x) is completed.

In the fine detection process (step 109x), the main control system 80 calculates the coma amounts from the plurality of image data, acquired in step 103x, while shifting the processing center position in the X and Y directions near the coarse center position calculated in step 107x (in the fine detection window). The main control system 80 detects a position at which the difference (an evaluation value X expressed by equation (4)) among the coma amounts calculated from the plurality of image data is minimum, and sets it as a fine center position (first fine center position).

The processing in the fine detection process (step 109x) is the same as in step 109 except for a difference in the detection parameters set in step S201. Accordingly, only step S201 in step 109x will be explained herein.

In step S201 of the fine detection process (step 109), the main control system 80 sets fine detection parameters. As fine detection parameters, the main control system 80 sets, for example, three parameters, that is, the width and height of the fine detection window, and the pitch at which the processing center is shifted in the X direction.

The width and height of the fine detection window is to be determined such that this window has a margin large enough to allow the amount of deviation of the coarse center position calculated in step 107x from a true processing center position to fall within the fine detection window size. The width and height of the fine detection window can be set to, for example, 2 pixels and 1 pixel, respectively. Also, the center shift pitch in the X direction is to be set to a value small enough to allow the amount of deviation of the fine center position calculated in step 109x from a true processing center position to fall within a tolerance practical from the viewpoint of ensuring the accuracy of wavefront aberration measurement. The center shift pitch in the X direction can be set to, for example, 0.1 pixels.

In the fine inspection step (step 109x) of the X processing center detection process (step 501), the main control system 80 shifts the processing center position only in the X direction, as described above. This is because a measurement apparatus of the LDI scheme generates a wavefront aberration measurement result insensitive to a change in the non-measurement direction (in step 501, the measurement and non-measurement directions are the X and Y directions, respectively) in principle. In other words, interference fringes formed by the X mark (the marks 61' and 71') have captured no spherical aberration information in the Y direction (its components have canceled each other). In this state, the coma hardly changes even upon shifting the processing center position in the Y direction, and this makes it difficult to detect the processing center position in the Y direction with high accuracy. Hence, in the fine inspection step (step 109x) of the X processing center detection process (step 501), the processing center position in the X direction is detected finely, but that in the Y direction is detected only coarsely.

In the first embodiment, it is possible to calculate an evaluation value which represents a coma change amount containing both $\cos \theta$ and $\sin \theta$ components. In contrast to this, the X processing center detection process (step 501) in the second embodiment uses only $\cos \theta$ components for that calculation because the wavefront aberration measurement result is insensitive to a change in coma in the Y direction (i.e., a change in $\sin \theta$ components).

The processing center position in the Y direction is corrected into a value having a precision as high as that of the processing center position in the X direction by correction processing in the detected position correction process (step 505; to be described later).

In the Y processing center detection process (step 503; a second determination process) subsequent to the X processing center detection process (step 501), the main control system 80 acquires a plurality of Y interference fringe image data having different spherical aberration amounts, and processes these image data, thereby calculating the Y interference fringe processing center position.

The detailed processing in the Y processing center detection process (step 503) is nearly the same as in step 001 in the first embodiment, like step 501, and will be explained with reference to the flowchart in FIG. 5. However, for the sake of distinction from the first embodiment, steps 101 to 109 in the first embodiment are replaced with steps 101y to 109y in the following description.

In the measurement position movement process (step 101y), the main control system 80 aligns the illumination optical system 14, the first mask 60', and the second mask 70'. More specifically, first, the main control system 80 adjusts the positions of the illumination optical system 14 and first mask 60' so that the light strikes only the mark 62' on the first mask 60'. Note that because the slit 62a' has a width which satisfies inequality (1), it outputs a diffracted light beam having an in-phase wavefront in the Y direction. The diffracted light beam illuminates the entire region in the pupil of the projection optical system 31. On the other hand, the light beam having passed through the window 62b' turns into that which bears the aberration information of the illumination optical system 14.

The main control system 80 adjusts the position of the substrate stage 42 so that the light having passed through the mark 62' on the first mask 60' forms an image of the mark 72' on the second mask 70' by the projection optical system 31. With this operation, the slit 62a' and window 62b' in the first mask 60' are imaged on the window 72b' and slit 72a', respectively, in the second mask 70'.

The light beam diffracted by the slit 72a' has an in-phase wavefront in the Y direction. On the other hand, the light beam having passed through the window 72b' bears the wavefront aberration information of the projection optical system 31 because it has passed through the projection optical system 31 after being shaped into an in-phase wavefront in the Y direction by the slit 62a'.

Steps 103y to 109y in the Y processing center detection process (step 503) are the same as steps 103x to 109x in the X processing center detection process (step 501) except for a difference in the detection parameters set in step 109y. Therefore, detection parameters in step 109y will only be described. Note that in step 107y, the coarse center position (second coarse center position) is determined based on Y interference fringes formed by the Y marks. Note also that in step 109y, the fine center position (second fine center position) is determined based on the Y interference fringes.

In step S201 of the fine detection process (step 109y), the main control system 80 sets fine detection parameters. As fine detection parameters, the main control system 80 sets, for example, three parameters, that is, the width and height of the fine detection window, and the pitch at which the processing center is shifted in the Y direction.

Figure 14B:
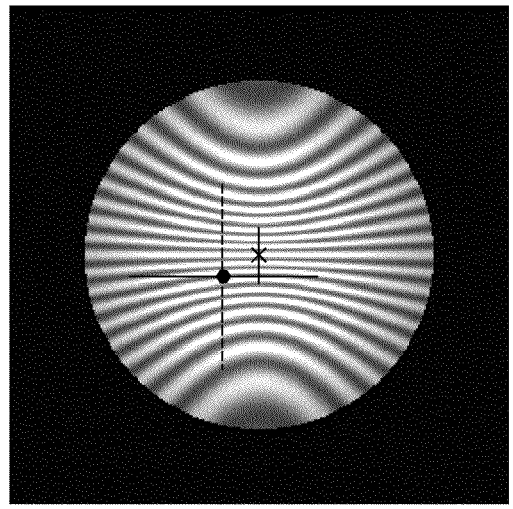

The width and height of the fine detection window is to be determined such that this window has a margin large enough to allow the amount of deviation of the coarse center position calculated in step 107y from a true processing center position to fall within the fine detection window size. The width and height of the fine detection window can be set to, for example, 1 pixel and 2 pixels, respectively. Also, the center shift pitch in the Y direction is to be set to a value small enough to allow the amount of deviation of the fine center position calculated in step 109y from a true processing center position to fall within a tolerance practical from the viewpoint of ensuring the accuracy of wavefront aberration measurement. The center shift pitch in the Y direction can be set to, for example, 0.1 pixels. FIG. 14B is a view illustrating the positional relationship among the tentative center position (a "●" mark), the coarse detection window (a dotted line), the coarse center position (a "×" mark), and the fine detection window (a solid line).

In the fine inspection step (step 109y) of the Y processing center detection process (step 503), the main control system 80 shifts the processing center position only in the Y direction, as described above. This is because a measurement apparatus of the LDI scheme generates a wavefront aberration measurement result insensitive to a change in the non-measurement direction (in step 503, the measurement and non-measurement directions are the Y and X directions, respectively) in principle. In other words, interference fringes formed by the Y mark (the marks 62' and 72') have captured no spherical aberration information in the X direction (its components have canceled each other). In this state, the coma hardly changes even upon shifting the processing center position in the X direction, and this makes it difficult to detect the processing center position in the X direction with high accuracy. Hence, in the fine inspection step (step 109y) of the Y processing center detection process (step 503), the processing center position in the Y direction is detected finely, but that in the X direction is detected only coarsely.

In the first embodiment, it is possible to calculate an evaluation value which represents a coma change amount containing both cos θ and sin θ components. In contrast to this, the Y processing center detection process (step 503) in the second embodiment uses only sin θ components for that calculation because the wavefront aberration measurement result is insensitive to a change in coma in the X direction (i.e., a change in cos θ components).

In the detected position correction process (step 505), the main control system 80 corrects the processing center position, in the Y direction, of the X interference fringes calculated in step 501 (the coarse center position in the Y direction calculated in the coarse detection process), and that, in the X direction, of the Y interference fringes calculated in step 503 (the coarse center position in the X direction calculated in the coarse detection process). Note that in step 501, the processing center position of the X interference fringes in the X direction (the first processing center position in the X direction) has been finely calculated in the fine detection process. Note also that in step 503, the processing center position of the Y interference fringes in the Y direction (the second processing center position in the Y direction) has been finely calculated in the fine detection process.

Figure 15:
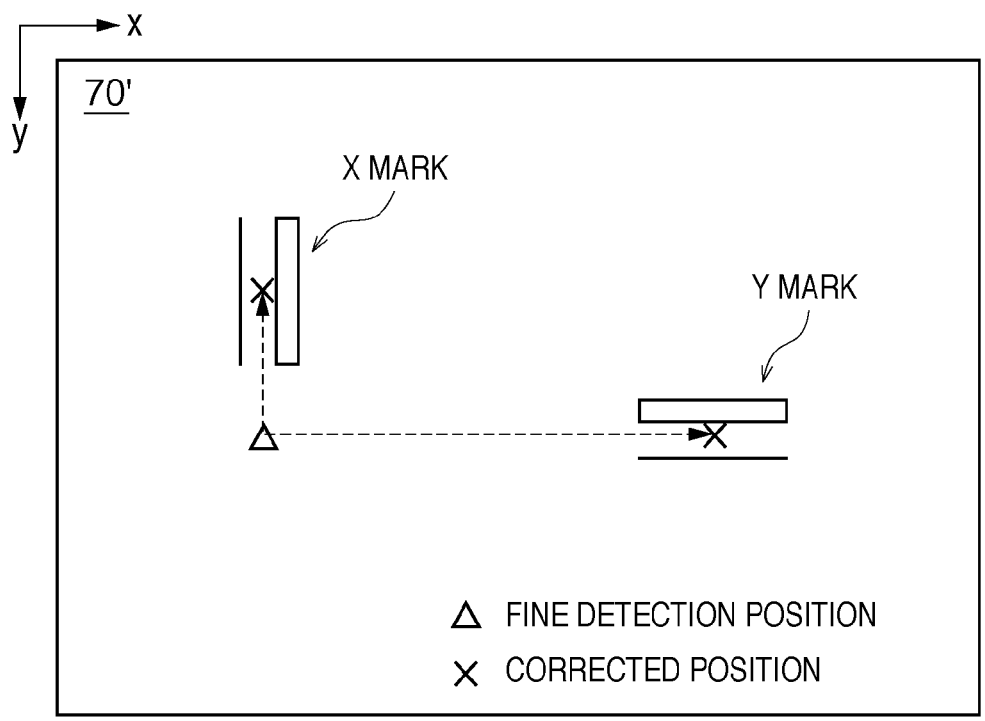
FIG. 15 is a schematic plan view for explaining step 505 of FIG. 13 in the second embodiment.

FIG. 15 is a plan view showing the concept of the correction method in step 505. Although FIG. 15 shows the same second mask 70' as that shown in FIG. 12, the arrangement of the X and Y marks in FIG. 15 differs from that in FIG. 12 for the sake of descriptive convenience.

The center positions finely detected in steps 501 and 503 are the processing center position of the X interference fringes in the X direction (the first processing center position in the X direction), and that of the Y interference fringes in the Y direction (the second processing center position in the Y direction). In other words, the positions detected in steps 501 and 503 are those obtained by finely (accurately) calculating the processing center positions in the X and Y directions at a position indicated by a Δ mark in FIG. 15.

The processing center position of the X interference fringes in the Y direction (the first processing center position in the Y direction), and that of the Y interference fringes in the X direction (the second processing center position in the X direction) can be corrected with high accuracy based on a difference (Dx, Dy) between the design positions of the X and Y marks, and a position (Δx, Δy) indicated by the Δ mark.

More specifically, the main control system 80 calculates fine processing center positions (Xx, Yx) and (Xy, Yy) of the X and Y interference fringes, respectively, in accordance with:

$$(Xx, Yx) = (\Delta x, \Delta y - Dy)$$

$$(Xy, Yy) = (\Delta x - Dx, \Delta y) \quad (5)$$

The main control system 80 stores the processing center positions (Xx, Yx) and (Xy, Yy) of the X and Y interference fringes, respectively, calculated in accordance with equations (5) in the memory in the measurement controller 55.

In the X-Y wavefront aberration calculation process (step 507), the main control system 80 processes the X interference fringes, acquired in step 501, using the processing center position (Xx, Yx) stored in the memory in the measurement controller 55. Also, the main control system 80 processes the Y interference fringes, acquired in step 503, using the processing center position (Xy, Yy) stored in the memory in the measurement controller 55. With these processing operations, the main control system 80 calculates the wavefront aberration of the projection optical system 31.

The method for measuring the wavefront aberration according to this embodiment can calculate the processing center position in the non-measurement direction, which is hard to finely determine, with high accuracy by the detected position correction process. This makes it possible to calculate the wavefront aberration of the projection optical system with high accuracy using the calculated processing center position. It is also possible to adjust the aberration of the projection optical system using the calculated wavefront aberration.

The present invention is not limited to the above-mentioned embodiments, and various changes and modifications can be made within the spirit and scope of the present invention.

For example, although a measurement apparatus is built in an exposure apparatus in the above-mentioned embodiments, a measurement apparatus, for exclusive use in wavefront aberration measurement, which has functions equivalent to those of the stage controllers 24 and 43 and projection system controller 32 may be provided instead.

Moreover, the steps in the flowchart shown in FIG. 4 or 13 need not be executed in the foregoing order. For example, steps 001, 501, 503, and 505 may be executed only at the time of assembly or periodical adjustment of the measurement apparatus, and steps 003 and 507 alone may be executed at the time of normal measurement. Even when the measurement apparatus used is of the LDI scheme, the correction process in step 505 may be omitted as long as it is set under an environment which enables fine detection in the non-measurement direction.

Although a measurement apparatus which uses a processing center position matching the wavefront (interference fringe) center has been explained as one example in the above-mentioned embodiment, these positions do not have to match each other depending on the mechanism of the measurement apparatus. If, for example, a substrate having a first mask is not flat but curved, processing for matching the processing center position with the position of the center of curvature (in place of the wavefront center position) may be performed.

Although slits and windows in the X and Y directions are used in the LDI scheme in the second embodiment, their orientations need not be limited to the X and Y directions. In other words, slits and windows in an arbitrary set of two directions (e.g., in a set of the 45° and 135° directions) other than the X and Y directions may be used.

Although a measurement apparatus of the LDI or PDI scheme is used in the above-described embodiments, the same principle applies to optical performance measurement apparatuses of all schemes, of measuring the optical performance of an optical system to be measured by exploiting interference fringes, such as the shearing and Fizeau interferometric schemes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-195313, filed Jul. 29, 2008, which is hereby incorporated by reference herein in its entirety.

What is claimed is:

1. A method comprising:
   determining a first processing center position to calculate a wavefront aberration of an optical system using a first mark including a first slit and a first window which are parallel to each other and extend along a first direction, by sequentially setting the optical system in a plurality of states in which the optical system has a plurality of spherical aberration amounts, and processing first interference fringe image data formed by the first mark and the optical system in each of the plurality of states;
   determining a second processing center position to calculate a wavefront aberration of the optical system using a second mark including a second slit and a second window which are parallel to each other and extend along a second direction orthogonal to the first direction, by processing second interference fringe image data formed by the optical system and the second mark in each of the plurality of states;
   correcting the first processing center position in the first direction using the second processing center position in the first direction and correcting the second processing center position in the second direction using the first processing center position in the second direction; and
   calculating a wavefront aberration of the optical system by processing the first interference fringe image data using the corrected first processing center position, and processing the second interference fringe image data using the corrected second processing center position.

2. The method according to claim 1, wherein
   the first processing center position in the second direction, and the second processing center position in the first direction are not corrected.

3. The method according to claim 1, wherein
   a processing center position corresponding to a peak of an evaluation value obtained by evaluating a plurality of first interference fringe image data corresponding to the plurality of states while shifting the processing center position is determined as the first processing center position, and
   a processing center position corresponding to a peak of an evaluation value obtained by evaluating a plurality of second interference fringe image data corresponding to the plurality of states while shifting the processing center position is determined as the second processing position.

4. The method according to claim 1, wherein
   a processing center position corresponding to a peak of an evaluation value obtained by evaluating a plurality of first interference fringe image data corresponding to the plurality of states while shifting the processing center position in the first and second directions around a tentative center position is determined as a first coarse center position, and
   a processing center position corresponding to a peak of an evaluation value obtained by evaluating a plurality of first interference fringe image data corresponding to the plurality of states while shifting the processing center position in the second direction around the first coarse center position is determined as a first fine center position, and
   a processing center position corresponding to a peak of an evaluation value obtained by evaluating a plurality of second interference fringe image data corresponding to the plurality of states while shifting the processing center position in the first and second directions around a tentative center position is determined as a second coarse center position, and
   a processing center position corresponding to a peak of an evaluation value obtained by evaluating a plurality of second interference fringe image data corresponding to the plurality of states while shifting the processing center position in the first direction around the second coarse center position is determined as a second fine center position.

5. The method according to claim 1, wherein the optical system includes a projection optical system in an exposure apparatus to transfer a pattern of an original onto a substrate.

6. A method comprising:
   determining a first processing center position to calculate a wavefront aberration of an optical system having a plurality of spherical aberration amounts using a first mark by sequentially setting the optical system in a plurality of states;
   determining a second processing center position to calculate a wavefront aberration of the optical system using a second mark;
   correcting the first processing center position in a first direction using the second processing center position in the first direction and correcting the second processing center position in a second direction using the first processing center position in the second direction; and calculating a wavefront aberration by processing the first and second interference fringe image data using the corrected first and second processing center positions, respectively.

7. The method according to claim 6, wherein the first mark includes a first slit and a first window, and the second mark includes a second slit and a second window, the first slit and window are in parallel and extend along the first direction, the second slit and window are in parallel and extend along the second direction, the first and second directions are orthogonal.

8. The method according to claim 6, wherein determining the first and second positions includes processing first and second interference fringe images formed by the first and second marks, respectively and the optical system in each of the plurality of states.

9. The method according to claim 6, wherein
the first position in the second direction, and the second position in the first direction are not corrected.

10. The method according to claim 6, wherein a position corresponding to a peak of an evaluation value obtained by evaluating a plurality of first interference fringe image data corresponding to the plurality of states while shifting the position is determined as the first processing center position.

11. The method according to claim 6, wherein a position corresponding to a peak of an evaluation value obtained by evaluating a plurality of second interference fringe image data corresponding to the plurality of states while shifting the position is determined as the second processing center position.

12. The method according to claim 6, wherein a position corresponding to a peak of an evaluation value obtained by evaluating a plurality of first interference fringe image data corresponding to the plurality of states while shifting the position in the first and second directions around a tentative center position is determined as a first coarse center position.

13. The method according to claim 12, wherein a position corresponding to a peak of an evaluation value obtained by evaluating a plurality of first interference fringe image data corresponding to the plurality of states while shifting the position in the second direction around the first coarse center position is determined as a first fine center position.

14. The method according to claim 6, wherein a position corresponding to a peak of an evaluation value obtained by evaluating a plurality of second interference fringe image data corresponding to the plurality of states while shifting the position in the first and second directions around a tentative center position is determined as a second coarse center position.

15. The method according to claim 14, wherein a position corresponding to a peak of an evaluation value obtained by evaluating a plurality of second interference fringe image data corresponding to the plurality of states while shifting the processing center position in the first direction around the second coarse center position is determined as a second fine center position.

16. The method according to claim 6, wherein the optical system includes a projection optical system in an exposure apparatus to transfer a pattern of an original onto a substrate.

* * * * *